United States Patent

Jacksen et al.

[11] 4,217,047
[45] Aug. 12, 1980

[54] OPTICAL PROJECTOR AND METHOD OF CREATING LIGHTING EFFECTS

[75] Inventors: Peter J. Jacksen, Pasadena; Arlen J. Kuklin, Hollywood; Peter R. Jacksen; James F. Vessely, both of Pasadena, all of Calif.

[73] Assignee: Jacksen International, Ltd., Culver City, Calif.

[21] Appl. No.: 850,611

[22] Filed: Nov. 11, 1977

Related U.S. Application Data

[63] Continuation-in-part of Ser. No. 750,654, Dec. 15, 1976, abandoned.

[51] Int. Cl.³ .................. G03B 29/00; G03B 21/00
[52] U.S. Cl. .................................... 354/77; 353/28
[58] Field of Search ............... 354/77, 245, 292, 296; 352/85, 89, 138; 353/28; 96/86 R

[56] References Cited

U.S. PATENT DOCUMENTS

| | | | |
|---|---|---|---|
| 1,572,315 | 2/1926 | Scholl | 352/85 |
| 1,601,886 | 10/1926 | Schufftan | 352/89 |
| 1,655,127 | 1/1928 | Beebe | 96/86 R |
| 2,077,500 | 4/1937 | Townsend et al. | 354/245 X |
| 2,294,622 | 9/1942 | Langberg et al. | 354/77 X |
| 2,972,931 | 2/1961 | Roob | 354/296 X |
| 3,101,025 | 8/1963 | Rosenfeld | 354/77 X |
| 3,227,509 | 1/1966 | Baker | 354/77 |
| 3,683,779 | 8/1972 | Lifton | 354/292 |

FOREIGN PATENT DOCUMENTS

| | | | |
|---|---|---|---|
| 557425 | 6/1959 | Canada | 354/77 |
| 228066 | 2/1909 | Fed. Rep. of Germany | 353/28 |
| 42-35455 | 8/1967 | Japan | 354/77 |
| 104283 | 3/1963 | Netherlands | 354/77 |
| 892256 | 3/1962 | United Kingdom | 352/85 |

*Primary Examiner*—John Gonzales
*Assistant Examiner*—Thomas H. Tarcza
*Attorney, Agent, or Firm*—Blakely, Sokoloff, Taylor & Zafman

[57] ABSTRACT

The apparatus includes a projector adapted for illuminating particular things such as art objects. The projector is constructed to receive a mask through which the projected light passes, the mask having an opening or aperture the contour of which conforms exactly to the shape of the object to be illuminated. In one form, the projector is constructed to have a photographic cassette of the self-developing type inserted into it so that a photograph can be made in the projector of the particular object that is to be illuminated. A photographic shutter may be provided with the projector for this purpose. The photograph obtained is superimposed on a sheet of metal masking material and then an aperture is cut in the masking material conforming to the outlines of the photograph of the object to be illuminated. In an alternate form, the projector is used in conjunction with a photosensitized mask blank which may be exposed through the projector lens system and then developed so that the image of the mask area to be cut is visible directly on the mask blank.

20 Claims, 12 Drawing Figures

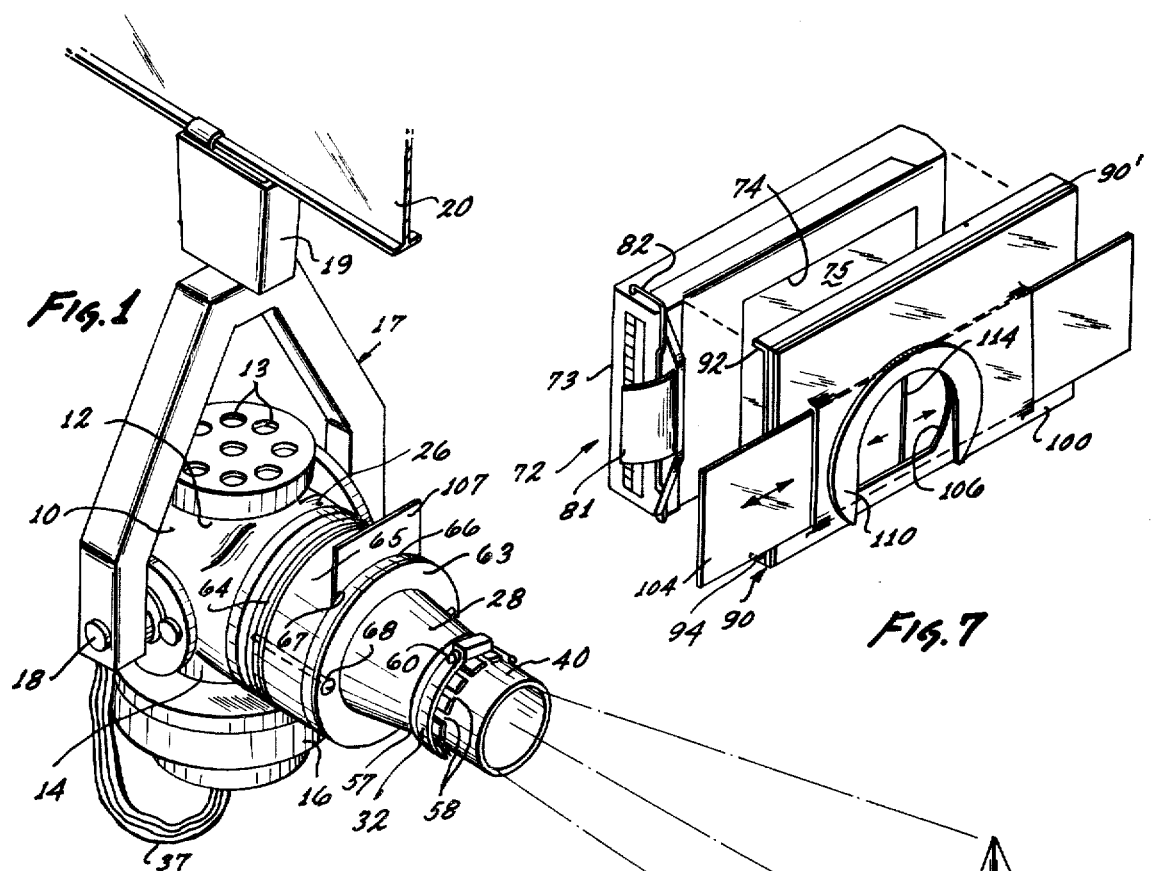

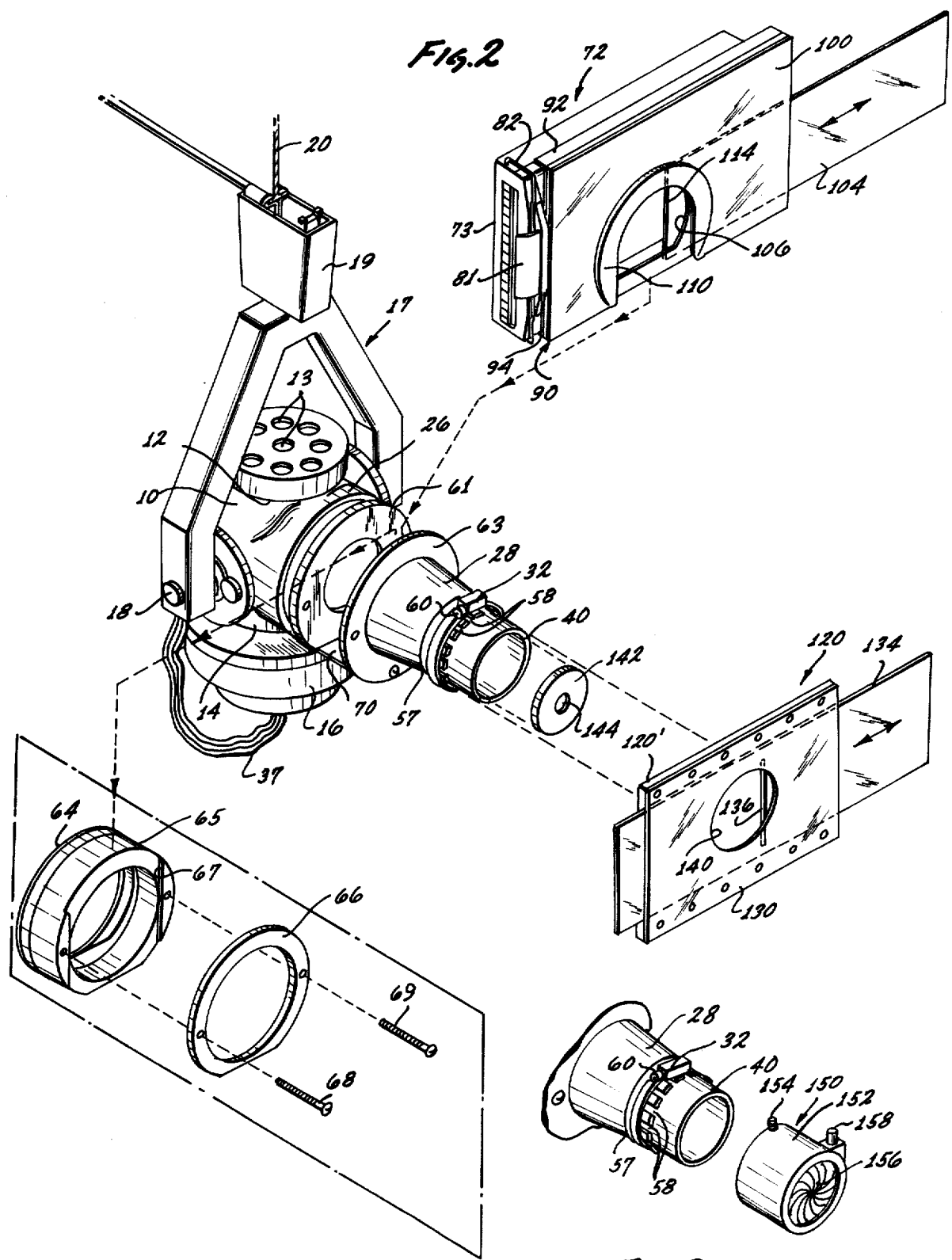

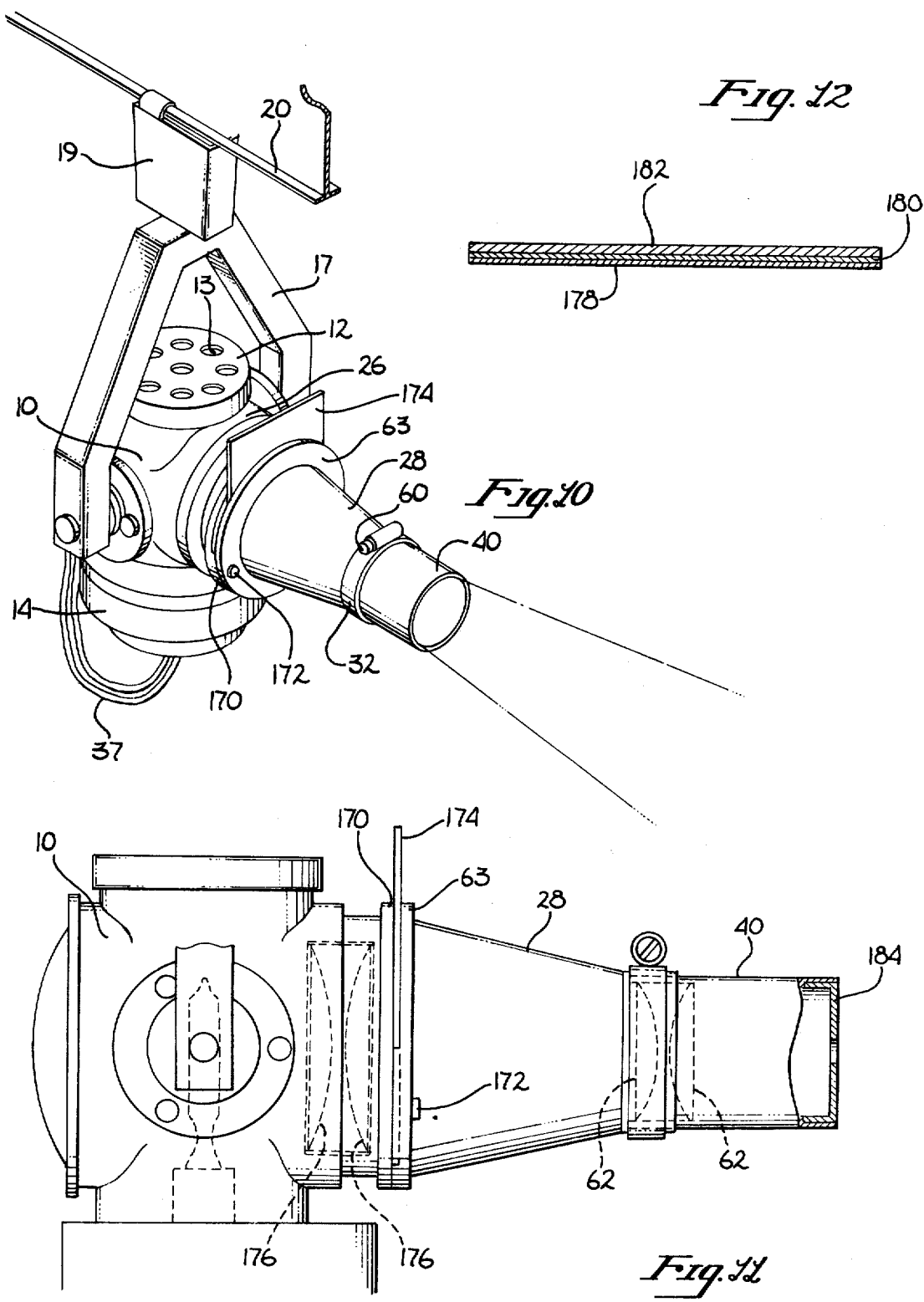

OPTICAL PROJECTOR AND METHOD OF CREATING LIGHTING EFFECTS

CROSS REFERENCES TO RELATED APPLICATIONS

This application is a continuation-in-part application of our copending application entitled "Optical Projector and Method of Creating Special Lighting Effects", Ser. No. 750,654, filed on Dec. 15, 1976, now abandoned.

BACKGROUND OF THE INVENTION

1. Field of the Invention

The field of the invention is that of lighting considered as an art. Optical projectors which project a beam of light offer the designer the ultimate in controlled illumination for both interior and exterior settings. The optical projectors referred to are utilized in the art for projecting a beam of light on particular objects such as art objects that it is desired to illuminate. The herein invention is concerned with unique forms of projectors to be utilized in the art and unique methods for making it possible to project a beam of light conforming in contour to a particular object to be illuminated.

2. Prior Art

Optical projectors as such for projecting a beam of light for use in illuminating objects are well known in the art. The herein invention, however, embodies particular improvements in optical projectors and unique methods of producing specialized lighting effects as outlined in detail hereinafter.

BRIEF SUMMARY OF THE INVENTION

The invention embodies an optical projector having components as briefly outlined in the abstract. The light is reflected by the parabolic mirror from the light source through the condensing and objective lenses and may be properly focused, the rays of light from the parabolic mirror being parallel. The projector may be suitably mounted in a desired position so that its beam of light is directed to a particular object such as a painting, an art object, a sculpture or the like, that it is desired to illuminate. In the exemplary form of the invention the projector has a slot formed in it into which a mask can be inserted, the mask having an opening or aperture having a particular shape or contour with the beam of light passing through the opening so that the beam of light itself has a particular contour. The method of the invention makes it possible to create such a beam of light having a contour conforming exactly to the contour of an object that it is desired to illuminate, whether the object is two-dimensional or three-dimensional. In executing the method the projector operates as a camera to take a picture of the object that it is desired to illuminate. In one form, the projector is constructed to be able to receive a photographic cassette of the self-developing type which is inserted into a slot in the projector. Upon opening the shutter of the cassette or a photographic shutter provided on the end of the projector the picture is made and developed by self-developing process. The picture is then laid on the metal masking material and the aperture is cut out conforming to the contour of the picture or image of the object to be illuminated. The mask being formed in this way can be inserted into a slot in the projector so that the projected beam of light corresponds exactly to the object being illuminated. In another form, the projector is used in conjunction with a photosensitized mask blank which may be exposed through the projector lens system and then developed so that the image of the mask area to be cut is visible directly on the mask blank.

BRIEF DESCRIPTION OF THE DRAWINGS

FIG. 1 is a pictorial view of one form of the invention illustrating its utilization.

FIG. 2 is a partly exploded view further illustrating the form of the invention shown in FIG. 1.

FIG. 3 is an elevational view partly in section of the device of FIGS. 1 and 2.

FIG. 7 is a partial view illustrating the shutter used with the photographic cassette.

FIG. 8 is a partial view of a modified form of the invention, utilizing a standard commercial shutter.

FIG. 10 is a pictorial view of another form of projector for making and using a mask formed by an alternate method.

FIG. 11 is a side view, partially cut away, of the projector of FIG. 10.

FIG. 12 is a typical cross-sectional view of a mask blank to be used with the projector of FIGS. 10 and 11.

DETAILED DESCRIPTION OF THE PREFERRED EMBODIMENTS

Figure 4:
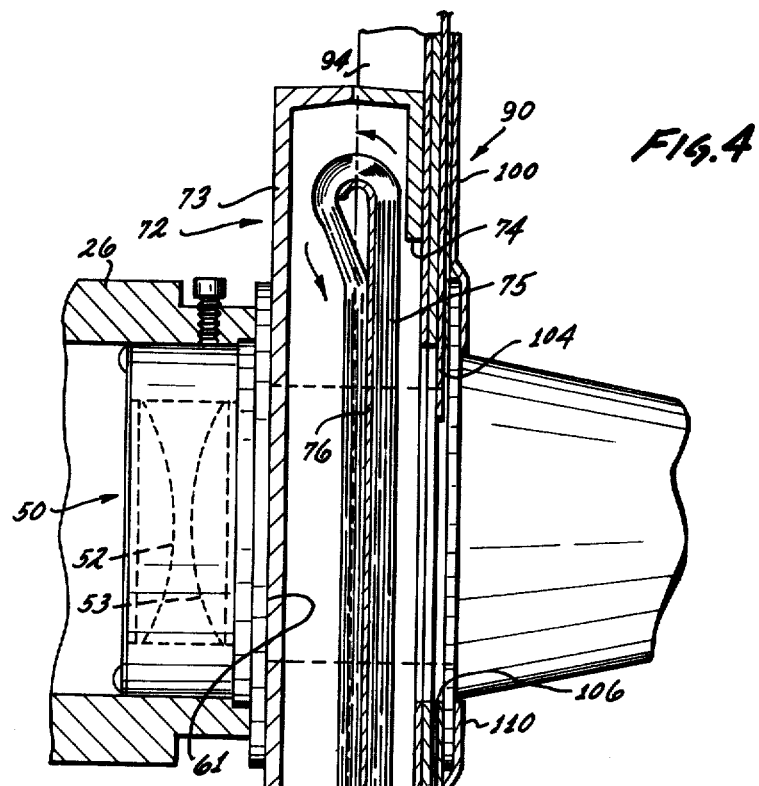
FIG. 4 is an enlarged sectional view of the part of the projector into which the photographic cassette is inserted, taken along line 4—4 of FIG. 3.

Referring to FIG. 1 and FIG. 2 of the drawings, the projector is shown having a generally cylindrical body part 10 having upper and lower cylindrical parts 12 and 14. Part 12 has ventilating openings 13. The numeral 16 designates a base below the body part 10. The projector may be mounted in any suitable position or place. As shown, it is supported by yoke or hanger 17 having legs pivotally attached to sides of the projector on pivots or arbors one of which is shown at 18. The yoke is carried from a trolley member 19 which can travel along an overhead track 20.

The projector has a forwardly extending cylindrical part 26 and extending from this part is a tapered section 28 which is joined to a further cylindrical part 40 by way of a joint as designated at 32. These parts are described more in detail in connection with FIG. 2 and FIG. 3. In FIG. 1 numeral 36 designates by way of example a particular object which it is desired to be illuminated, the object being shown as a pyramid. The parts 28 and 40 may be formed as unit which is separable from the body of the projector as described later in connection with FIG. 9.

Referring to FIG. 2, as may be seen base 16 has a power cable 37 leading to it. At the rear part of the body 10 of the projector there is mounted a parabolic mirror (not shown) by way of a holding ring within the body 10. Numeral 46 designates a lamp carried on a base 47 which is connected to a suitable power source in order to provide an appropriate degree of illumination. See FIG. 3.

Numeral 50 designates a suitable system of condensing lenses carried within a cylindrical lens ring 51 that fits within the cylindrical part 26 of the projector. The lenses include the condensing lenses 52 and 53 mounted in rings 51 carried in part 26.

The forward part of section 28 is cylindrical as designated at 57 and has axial slots 58 with cylindrical section 40 fitting into the part 57. These parts may be clamped together by a clamping band 32 of a known type, the ends of which are joined by means of holding nut 60. Section 40 carries an objective lens system 62 and focusing of the beam of light is possible by adjusting the section 40 carrying the lens system 62 relative to the tapered part 28. See FIG. 3.

The construction as so far described conforms generally to optical projectors as known in the art and that are used for projecting a beam of light to illuminate particular objects. In such a projector the forward part of section 26 is simply a complete cylinder rather than being modified as described hereinafter.

The projector of this form of the invention is constructed so that it can be used to take a picture of the particular object which it is desired to illuminate. The picture is taken by way of a photographic cassette of the self-developing type. This construction is illustrated in FIGS. 1–3 and more in detail in FIG. 4. The section 26 of the projector is provided with a slot or cutout 61, the base or bottom of which is designated at 70 so that a photographic cassette or self-developing film pack as designated generally by the number 72 can be inserted into the slot as shown in FIGS. 2, 3 and 4. The photographic cassette preferably may be of a known conventional type or may be a self-developing film pack. The forward wall of the cutout can be filled by three substantially cylindrical inserts 64, 65 and 66, positionable as shown in FIG. 1. (See FIG. 3 also). The inserts can be secured by screws as shown at 68 and 69, which extend through wall 63. Inserts 64–66 each has a flat on the bottom to fit bottom 70. Insert 65 is thicker and has a guideway 67 to receive mask 107 as will be described.

The cassette can be of various types that include film capable of producing an image or picture. As illustrated, a commercial self-developing pack is utilized as shown at 72 in the figures. The housing of the self-developing film pack is designated at 73. Since its construction is conventional and known, it is illustrated schematically. Housing 73 has a front opening 74. FIGS. 1, 2, 3 and 4 illustrate how the self-developing film pack is fitted into the cutout slot 61 in the projector. The film is designated at 75 within the housing 73, the film having a portion lying against a support plate or film rest platform 76. Included in the housing is developing gel not shown. The end of the film passes out of the housing through a slot 78 passing between rollers 79 and 80. Numeral 81 designates a paper pull tab attached to the film. Part 76 is the film rest platform and film emulsion surface. When the film is pulled out and the developing gel reaches the rollers 79–80, it is evenly spread over the exposed film emulsion to develop the picture. Numeral 82 designates a wire grip or handle which is part of the Polaroid pack whereby the housing 73 can be opened by separating its two parts.

FIGS. 1–4 and 7 illustrate an accessory 90 which is used with the self-developing film pack 72 in the projector. The accessory 90 is in the form of a plate 92 having top and bottom flanges 92 and 94 so that it can be clipped or fastened to the front side of the self-developing film pack 72 in a position over the front opening 74 of the self-developing film pack. The accessory 90 has a front panel 100 which is extended outwardly from the surface 92 providing slits or openings at the ends of the panel 100 to receive a sliding shutter strip 104. Panel 92 has a partially circular front opening which aligns with the opening 74 in the housing 73 of the self-developing film. Secured on the panel 92 is a collar member 110 which is semicircular, the inside edge of which forms a flange, spaced from the surface of the panel 92 for a purpose which will be described presently.

The accessory 90 and the self-developing film pack 72 are assembled together as described. The inserts 64–66 are removed from the cutout 61 and then the assembly of the Polaroid pack 72 and the accessory 90 are inserted into the cutout in a position as illustrated in FIGS. 3 and 4. In this position the flange of the collar 110 fits down over the circular wall member 63 which is part of the projector as may be seen in FIGS. 3 and 4. The opening 106 in the plate 92 is aligned with the self-developing film pack as stated and also with the beam of light that emanates from the lamp 46 through the lenses 52 and 53. The shutter strip 104 may have a vertical slit 114 in it, although preferably the shutter strip does not have the slit 114, a photograph being made in a manner as described hereinafter. With the slit 114 in the shutter strip, however, the projector is now a camera and can be directed at the object that is to be photographed and then the film in the self-developing film pack can be exposed by sliding the shutter strip 104 laterally to move the slit 114 laterally with respect to the film.

Numeral 120 as shown in FIGS. 2 and 3 designates a further accessory which is normally used for purposes of taking a photograph of the object such as the object 36 by exposing the film in the self-developing film pack. This accessory includes plate 120 having an extending circular flange 122 as may be seen in FIG. 3. The flange fits over the cylindrical part 40 of the projector and it can be clamped into place by clamping band 124 having flanges secured together by bolt 126. Secured to the plate 120 is another plate 130 which has a way formed on the inside of it as designated at 132 in FIG. 3 to receive a laterally sliding shutter strip 134, the shutter strip having a vertical slot 136. Plates 120 and 130 are secured together preferably by rivets. Plate 130 has a round opening in it as designated at 140 which aligns with the cylindrical part 40 of the projector. Numeral 142 designates a circular plug disc having central opening 144 which can be fitted into the cylindrical part 40. Its purpose is to reduce the size of the projected beam of light and/or the light that is allowed to enter the projector.

The technique of taking a picture of the object that is to be illuminated, that is of exposing the film in the self-developing film pack is as follows. The accessory 90 which clips onto the self-developing film pack 72 is preferably utilized simply to prevent exposure of the film until it is desired to take a picture. At that time the shutter strip 104 is withdrawn. With the accessory 120 in place the exposure is made simply by moving the shutter strip 134 laterally so as to move the slit 136 past the circular opening 140, whereby the film is exposed and the picture made.

After exposure, the self-developing film pack is removed and the developed picture is taken out of it.

Figure 5:
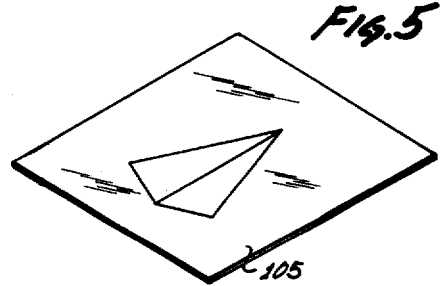
FIG. 5 is a detail view illustrating a photograph as taken by the apparatus.

In this form, the mask is produced by the method to be described presently. FIG. 5 illustrates the photograph 106 of the object 36 that is to be illuminated.

Figure 6:
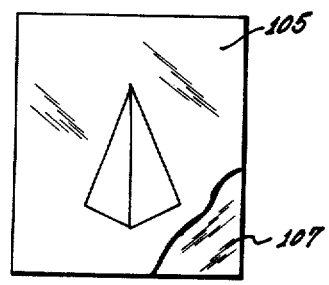
FIG. 6 is an illustrative view illustrating a photograph superimposed on the masking material for cutting out an aperture conforming to the contour of the image photographed.

After the photograph is made it is laid over a piece of metal mask material which may be aluminum or copper or the like as designated at 107 in FIG. 6. As may be seen in FIG. 1, the mask 107 can be inserted into the slot 67 in insert 65 as will be described more in detail hereinafter. After the picture is taken the self-developing film pack 72 and accessory 90 are removed from cutout 61 and inserts 64–66 are put back in place as shown in FIG. 1.

The Method

The following describes the execution of the method. In executing the method the self-developing film pack 72 and accessory 90 are inserted into the projector as described in the foregoing in the slot 61. This is done after the projector has been accurately aimed or directed towards the object that is to be illuminated, this, of course, being done by having the light turned on and directing the beam at the object to set both focus and field of view. The photographic image may be a timed exposure accomplished by a timing period determined by movement of strip 134 or by the shutter mechanism 150. Shutter strip 104 is of course moved at the time the exposure is to be made.

The photographic image having been made as illustrated at 105, as indicated in the foregoing it is then superimposed on the sheet 107 of metal masking material. See FIGS. 5–6. The material of the mask is then cut out along the outlines of the image of the photograph so that the aperture in the mask conforms in contour to the contour of the photographic image.

The mask 107 can now be inserted into the slot 67 which is forward of the condensing lens 53 so that a beam of light is then transmitted which has a cross-sectional contour conforming exactly to the contour of the object to be illuminated. The object to be illuminated may be a painting, a printed certificate or a three dimensional sculpture or otherwise. With the mask as thus made, the area of illumination conforms exactly to the contour of that which it is desired to be illuminated.

FIG. 8 shows a modified form of the invention wherein a regular commercial photographic shutter is used instead of the accessory 120. The photographic shutter is designated at 150, being in the form of a cylinder 152 which is of a size to fit over the cylindrical end part 40 of the projector with the set screw 154 to hold it in place. The shutter vanes are designated at 156 in the end of the cylinder 152 being operable in a conventional manner by push-button 158. If the shutter mechanism as shown in FIG. 8 is used in place of the accessory 120, the self-developing film pack 72 and accessory 90 are used in the manner described in the foregoing.

Figure 9:
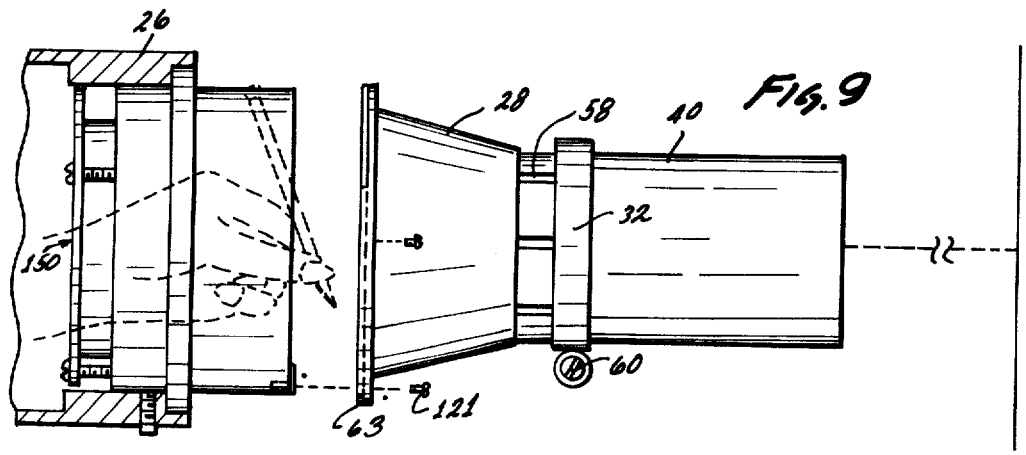
FIG. 9 is a partial view of another modified form of the invention.

FIG. 9 illustrates a simplified form of the invention. The optical projector as shown in FIG. 1 may be of a type in which the forward assembly including the parts 28 with flange 63 and 40 is detachable from the body of the projector normally being held in assembled relationship by means of the set screws one of which is shown at 121. As illustrated in FIG. 9, this portion of the optical projector is positioned to be directed towards the object or thing which it is ultimately desired to illuminate. Then a sheet of material which by way of example may be frosted acetate is placed over the end of the tapered portion 28 at flange 63 so that when the user looks through this material the image of the object to be illuminated can be seen. The user then simply makes an outline drawing of the object or a painting of it as viewed on the acetate material, and the mask is then made from the image on the acetate material as described in connection with the previous embodiments wherein the mask is made from a photograph. When the mask is made in this manner, the method is practiced as described in the foregoing.

Now referring to FIGS. 10 and 11, a projector similar to that of FIG. 1 may be seen. Because of the similarity between these two embodiments, various elements of the same design are identified by the same numerals as hereinbefore used in FIG. 1 and the related figures, and accordingly will not be further described herein. However, in this embodiment, numeral 70 of the earlier embodiment is eliminated so that the flange wall 63 is coupled at least at the sides thereof directly to flange 170 at the forward portion of body member 10 by screws 172. The flange 63 is slotted on the face thereof to receive the mask 174 at a position between flanges 63 and 170 just ahead of the condensing lenses shown in phantom in FIG. 11 as lenses 176. At the forward portion of tapered member 28 is a cylindrical section 40 housing the objective lenses 62 shown in phantom in FIG. 11, with section 40 being adjustable along the optical axis of the projector for focusing purposes. More specifically, the function of the projector is to project light over a specifically defined area as determined by the opening or openings in the mask 174 defining the area to be illuminated. Accordingly, in normal use the objective lenses are adjusted so that the "image" of the opening in mask 174 is focused in the area to be illuminated so as to provide a relatively sharp division between the illuminated areas and the non-illuminated areas. Because of the bilateral nature of optical systems, however, the same focusing which will focus the image of the mask onto the area to be illuminated will also focus the image of the area to be illuminated onto the mask plane, a fact which is used to advantage in this as well as the hereinbefore described embodiments of the invention. Thus, in this form of practicing the invention, a special mask blank, a cross-section of which is shown in FIG. 12, is used. In particular, a sheet-like mask blank 178 is first painted with a layer of white paint 180 and then coated with a photosensitive emulsion layer 182. In the preferred embodiment, the mask blank material itself is preferably a springbrass having a thickness of approximately 5/1000 of an inch. This provides a material which may be readily cut with a sharp knife to provide a sharp, well-defined and appropriately shaped aperture or apertures without bending, etc. under the knife pressures, and provides a finished mask which is resistent to deforming under the temperatures and temperature gradients it will normally be subjected to in use.

Obviously, any of a large number of commercially available photosensitive emulsions may be used in this form of the invention. However, most emulsions are relatively fast, thereby requiring only a minimum exposure, probably best controlled with a suitable shutter assembly. However, since it is most convenient not to have to seal the region of the projector receiving the mask blank and not to have to load and unload the mask blanks into the projector under darkroom conditions, relatively slow emulsions are preferred. In fact, in the preferred form, an emulsion manufactured by the Rockland Colloid Corporation, Paramount, N.Y., and sold as their Emulsion No. BB201 is used. This emulsion is sufficiently slow so that the mask blanks, though requiring storage in dark or blackened containers, can be loaded and unloaded in the projectors of FIGS. 10 and 11 under subdued lighting without significant deterious effects. Accordingly, fabrication of the mask in accordance with this form of the invention proceeds by first preparing the mask blanks and storing them under darkened conditions. Then, with adjacent lighting (and of course, the projector) turned off or at least the mask blank well shaded from direct lighting, the mask blank is placed in position in the projector with the photosensitive surface thereof facing the objective lenses. Thereafter, the area within the field of view of the projector is illuminated, preferably relatively strongly by daylight blue photography lamps for the desired exposure time, normally for the stated emulsion in the region of three to twelve minutes. It has been found desirable for such purposes to include the use of a light-reducer 184 to reduce the aperture and extend the exposure times to the approximate range stated. At the end of the exposure time, the daylight blue lighting is turned off and the mask blank is removed, again being stored in a darkened container until developed. For the stated emulsion, development proceeds like the development of a standard black and white print, with developer and universal fixer used in accordance with the manufacturer's instructions providing highly suitable results. In particular, an image will be produced somewhat resembling a lithograph, perhaps not being scaled as well as in conventional black and white photography, yet providing a highly adequate definition of light and dark regions to allow easy visual perception of the region of the mask to be cut away. Obviously, when the desired regions are cut away and the mask reinserted in the projector for use, the projector will illuminate the region exactly as defined by cutting away the respective portion of the image and mask material on the mask blank. (A separate camera like device having the same optical characteristics as the projector could be temporarily mounted in the normal projector position and used for exposure of the mask, though such expense and complexity is not required).

It was mentioned hereinbefore that the mask blank 178 is preferably first coated with a layer of white paint 180 prior to the application of the photosensitive emulsion layer 182. Actually, for the emulsion and mask blank material stated, it has been found that the emulsion does not wet the mask substrate very well, thereby tending to prevent the establishment of the desired emulsion film on the brass mask material. Accordingly, it has been found desirable to provide some suitable intermediate layer for the layer 180 which will both stick to the brass material in a thin film and be readily wetted by the emulsion to provide a well-defined emulsion layer. While clear coatings such as varnishes, etc., are suitable for this purpose, the use of white paint is preferred as the white background provides greater contrast for the developed image. Conventional spray paints available in aerosol cans are highly satisfactory and most convenient for use for this purpose.

The emulsion may be applied to the coated surface of the brass mask blank by any suitable technique. However, highly satisfactory results have been achieved by merely dipping the mask blank into a bath of the emulsion and withdrawing the blank so that excess emulsion drains away. This technique has been found to provide a suitably thin and very smooth coating, giving the desired result with the simplest possible processing. Since the emulsion will not wet the brass and only one surface of the brass mask blank is painted, dipping provides a thin and smooth coating over the painted surface without coating the back of the blank. Once coated, of course, the blank should be dried and maintained in a darkened container until removed for exposure and returned to the container until developed. In that regard, for the specific emulsion identified herein, it has been found that exposure of the photosensitive surface to direct incandescent lighting for a period in the range of five to ten seconds causes substantial clouding of the resulting image. Accordingly, exposure of the mask blank to direct lighting (other than during intentional exposure) prior to development should be avoided and exposure to strongly shaded light should be limited to whatever time is reasonably necessary for insertion and removal of the mask blank from the projector prior to and subsequent to the exposure thereof.

From the foregoing those skilled in the art will understand the nature and construction of the invention and the manner in which the methods are executed and utilized. Those skilled in the art will appreciate the manner in which all of the objects as set forth in the foregoing are realized. As may be seen, the invention is a substantial advance in the art of controlled illumination and decorating so to speak by way of lighting effects. The invention makes possible the artistic use of lighting projectors and of illumination and lighting effects by facilitating the simple fabrication of custom masks to provide the lighting effect desired.

The foregoing disclosure is representative of preferred forms of the invention and is to be interpreted in an illustrative rather than a limiting sense, the invention to be afforded the full scope of the claims appended hereto.

We claim:

1. An optical projector comprising means including a source of illumination, means for causing a beam of light to be projected from the projector onto an object to be illuminated, photographic means for producing an image of the object to be illuminated, wherein said photographic means of the projector is constructed to be able to receive in it a self-developing film pack, and means for exposing the film in the self-developing film pack to produce an image, and means including a removable mask constructed to be inserted in the projector at the location in said projector where said image is to be produced so that the beam of light passes through an opening in said mask, said opening conforming to the contour of the object to be illuminated, whereby the mask passes a beam of light having a contour conforming to the contour of the object to be illuminated.

2. An optical projector comprising means including a source of illumination, means for causing a beam of light to be projected from the projector onto an object to be illuminated, photographic means for producing an image of the object to be illuminated, wherein said photographic means of the projector is constructed to be able to receive a self-developing photographic cassette for purposes of producing an image of the object to be illuminated, and means including a removable mask constructed to be inserted in the projector at the location in said projector where said image is to be produced so that the beam of light passes through an opening in said mask, said opening conforming to the contour of the object to be illuminated, whereby the mask passes a beam of light having a contour conforming to the contour of the object to be illuminated.

3. An optical projector comprising means including a source of illumination, means for causing a beam of light to be projected from the projector onto an object to be illuminated, photographic means for producing an image of the object to be illuminated, wherein said photographic means comprises a removable mask blank having a side coated with a photosensitive emulsion, said mask blank is fabricated from spring brass, and said side is painted white prior to receiving said coating of emulsion, and means including a removable mask constructed to be inserted in the projector at the location in said projector where said image is to be produced so that the beam of light passes through an opening in said mask, said opening conforming to the contour of the object to be illuminated, whereby the mask passes a beam of light having a contour conforming to the contour of the object to be illuminated.

4. A method of projecting a beam of light having a cross-sectional contour conforming to the contour of an object that it is desired to illuminate, including the steps of:

making a photographic image of the object in the optical projector,
 wherein said step of making a photographic image in the projector itself includes the steps of placing a self-developing photographic cassette in the optical projector and exposing film in said self-developing photographic cassette for forming the image of said object;
 preparing a mask from the photographic image so that the mask can pass a beam of light having a contour corresponding to the contour of the photographic image; and
 positioning said mask, at the location in said optical projector where said photographic image of the object was produced, in a position to have the beam of light pass through the mask whereby the illumination corresponds exactly to the contour of the object to be illuminated.

5. A method of projecting a beam of light having a cross-sectional contour conforming to the contour of an object that it is desired to illuminate, including the steps of:

making a photographic image of the object in the optical projector;
 preparing a mask from the photographic image so that the mask can pass a beam of light having a contour corresponding to the contour of the photographic image,
 wherein said step of preparing a mask from the photographic image includes the steps of superimposing the photographic image on a metal plate constituting the mask plate and cutting through the mask plate along the outline of the image to produce an opening corresponding to the contour of the object to be illuminated; and
 positioning said mask, at the location in said optical projector where said photographic image of the object was produced, in a position to have the beam of light pass through the mask whereby the illumination corresponds exactly to the contour of the object to be illuminated.

6. A method of projecting a beam of light having a cross-sectional contour conforming to the contour of an object that it is desired to illuminate, including the steps of:

making a photographic image of the object in the optical projector;
 preparing a mask from the photographic image so that the mask can pass a beam of light having a contour corresponding to the contour of the photographic image,
 wherein said step of preparing a mask from the photographic image includes the steps of projecting said photographic image of the object onto a sheet material and tracing the outline of the image on the material; and
 positioning said mask, at the location in said optical projector where said photographic image of the object was produced, in a position to have the beam of light pass through the mask whereby the illumination corresponds exactly to the contour of the object to be illuminated.

7. A projector as in claim 2, wherein said photographic means of the projector has a shutter mechanism mounted on it for exposing the film.

8. A projector as in claim 7, wherein said photographic means of the projector has removeable means providing space for insertion of the cassette in position aligned with the source of reflected image of the objects to be illuminated.

9. A projector as in claim 8, wherein the projector has a barrel part housing said photographic means, said barrel part having a means for inserting and removing said photographic cassette.

10. A method of preparing an optical projector mask having an opening corresponding to the contour of an object to be illuminated, comprising the steps of:

providing a mask blank constructed to be removeably inserted in such projector;
 coating said mask blank with a layer of emulsion;
 exposing said mask blank to an image of the object to be illuminated, at the location in said projector where the finished mask is to be inserted when being used in the projector mode;
 developing said emulsion to produce the image of the object to be illuminated; and
 cutting through said mask blank along the outline of said image to produce an opening corresponding to the contour of the object to be illuminated.

11. The method of claim 10, further including the step of painting a side of said mask blank white prior to coating said side with said emulsion.

12. The method of claim 10 wherein said mask blank is fabricated from spring brass.

13. The method of claim 10 further including the step of inserting said coated mask blank into said optical projector prior to exposing said emulsion so that the image of the object to be illuminated may be focused onto the mask blank.

14. The method of claim 10 wherein said emulsion is selected to have a typical exposure time approximately in the range of three to twelve minutes.

15. A method of fabricating an optical projector mask having an opening corresponding to the contour of an object to be illuminated and for insertion into a projector so that the image of the mask opening may be projected onto the object to be illuminated, comprising the steps of:

providing a mask blank constructed to be removeably insertable in such projector;
 coating at least a portion of said mask blank with a layer of photosensitive emulsion;
 inserting said mask blank into said projector at the location in said projector where the finished mask is to be inserted when being used in the projector mode;
 illuminating such object with another light source so that an image of such object is produced on said mask blank to expose said emulsion;

developing said emulsion to produce an image of such object; and cutting through said mask blank along the outline of said image to produce an opening in said mask corresponding to the contour of the object to be illuminated.

16. The method of claim 15 wherein said emulsion is selected to have a typical exposure time approximately in the range of three to twelve minutes.

17. The method of claim 15 further comprising the step of coating said portion of said mask blank with an intermediate layer of material prior to coating with emulsion.

18. The method of claim 17 wherein said emulsion is applied by dipping said mask blank in said emulsion.

19. The method of claim 17 wherein said intermediate layer is white.

20. The method of claim 19 wherein said mask blank is fabricated from spring brass.

* * * * *